United States Patent [19]

Stocks et al.

[11] Patent Number: 4,845,334
[45] Date of Patent: Jul. 4, 1989

[54] PLASMA FURNACE INERT GAS RECYCLING SYSTEM AND PROCESS

[75] Inventors: Stephen C. Stocks, Albany; Patrick L. Rasmussen, Corvallis, both of Oreg.

[73] Assignee: Oregon Metallurgical Corporation, Albany, Oreg.

[21] Appl. No.: 148,684

[22] Filed: Jan. 26, 1988

[51] Int. Cl.⁴ .............................................. B23K 9/00
[52] U.S. Cl. ........................... 219/121.59; 219/121.55; 219/121.49; 373/18; 432/21; 432/72; 55/338
[58] Field of Search ................... 219/121.39, 121.36, 219/121.59, 121.49, 121.37, 121.55; 373/18–22; 432/72, 75, 21, 48; 165/42; 55/319, 321, 338, 339

[56] References Cited

U.S. PATENT DOCUMENTS

| | | | |
|---|---|---|---|
| 3,194,941 | 7/1965 | Baird | 219/121 |
| 3,581,469 | 6/1971 | Davis et al. | 55/126 |
| 3,894,573 | 7/1975 | Paton et al. | 164/52 |
| 3,935,371 | 1/1976 | Camacho et al. | 13/2 |
| 4,102,766 | 7/1978 | Fey | 204/164 |
| 4,231,768 | 11/1980 | Seibert et al. | 55/179 |
| 4,295,343 | 10/1981 | Izumi | 62/309 |
| 4,297,116 | 10/1981 | Cusick | 55/319 |
| 4,450,900 | 5/1984 | Nathan | 165/42 |
| 4,490,162 | 12/1984 | Davis | 55/213 |
| 4,531,070 | 7/1985 | Kuhn | 310/56 |

Primary Examiner—M. H. Paschall
Attorney, Agent, or Firm—Klarquist, Sparkman, Campbell, Leigh & Whinston

[57] ABSTRACT

A system and method for conditioning and recycling inert gases which are used in a plasma furnace. The method comprises the steps of receiving the gas that is output from the plasma furnace and cooling the gas to a desired temperature. Substantially all the dust is removed from the gas and then the gas is compressed to the desired pressure using an oil-flooded screw compressor. Any oil which is introduced by the compressor is removed from the gas and an alarm is provided to signal a high oil level. Substantially all water vapor in the gas is removed and the gas is filtered to remove any remaining dust and small particulates. The amounts of water vapor and oxygen in the gas are monitored. The gas is then recycled to the plasma furnace.

23 Claims, 1 Drawing Sheet

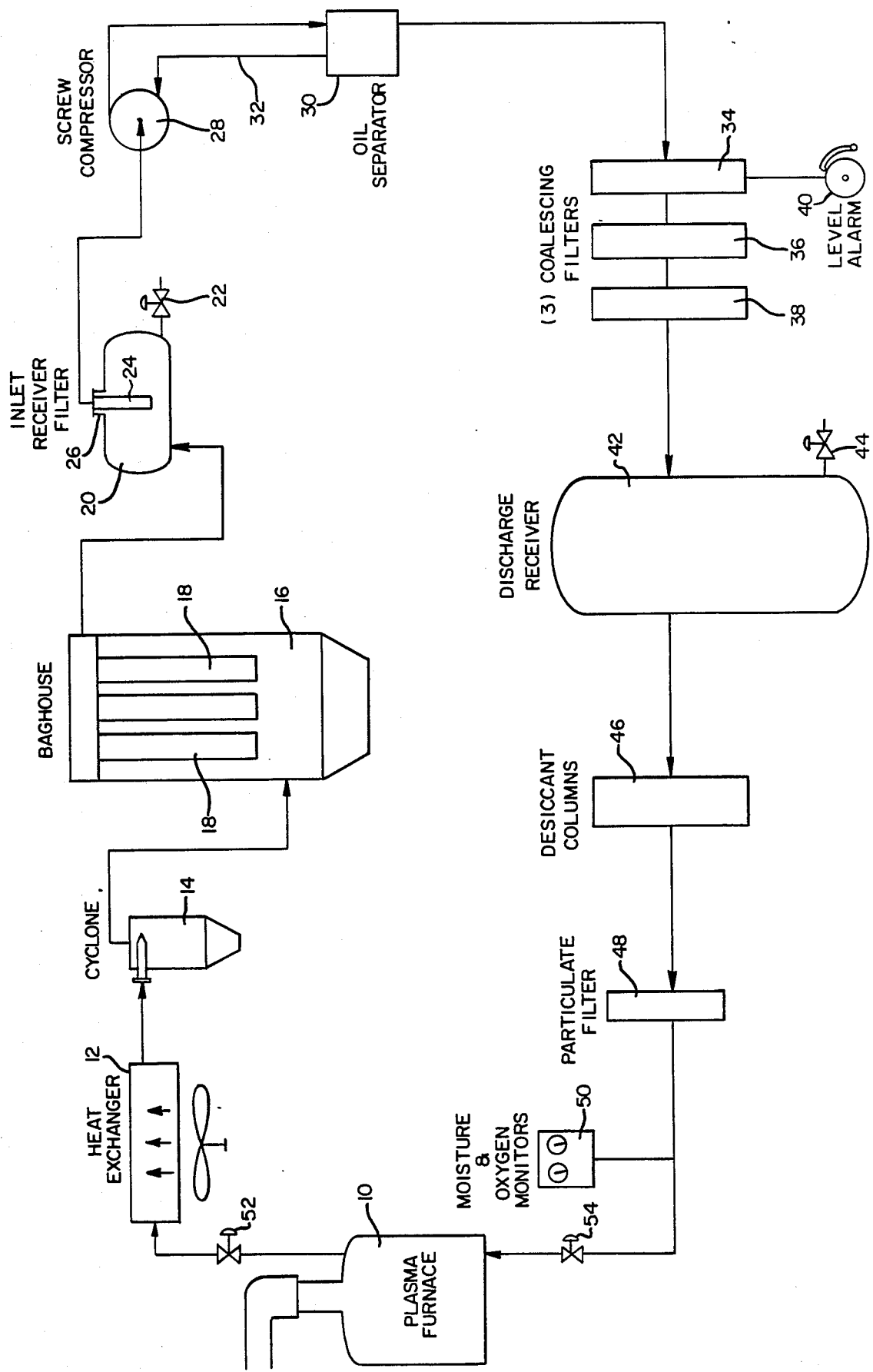

PLASMA FURNACE INERT GAS RECYCLING SYSTEM AND PROCESS

BACKGROUND OF THE INVENTION

1. Field of the Invention

The present invention relates to the recycling of inert shielding gases used in a plasma furnace, and, in particular, to a system and process for conditioning and recycling inert gases such as argon and helium to a plasma furnace.

2. Description of the Prior Art

In many metallurgical applications, metals are melted, annealed and refined in furnaces under high heat for producing various products. One commonly-used furnace is a plasma furnace, which uses a plasma torch as a heat source, such as described in U.S. Pat. No. 3,194,741 to Baird. In general, a plasma torch is a stream of gas through which an electric arc is drawn. This heats the gas, which then can be used for cutting, welding or other purposes, such as melting the metal feedstock.

In order to control the arc and provide the proper atmosphere in the furnace, inert gases are used. These inert gases lessen problem oxidation, which occurs if oxygen or air contacts the molten metal. Besides the inert gas flowing through the torch, additional streams are used for cooling and for purging viewports and some chambers. In most applications, the entire furnace is a closed unit from which air is evacuated and then backfilled with the inert gas.

The inert gas is typically argon, helium, nitrogen or hydrogen or a mixture of these gases. The choice of gases to be used depends on the process and the particular metal to be melted. Inert gas flow rates depend on the size of the furnace, but are in the range of 40 to 150 standard cubic feet per minute for a typical-size furnace. Based on these flow rates, the cost to put nonrecycled gas through the plasma torch can be approximately $300 per hour, or $600,000 per year based upon a process time of 2000 hours per year. Thus, the desirability of gas recycle is apparent.

When the inert gas emerges from the plasma furnace, it if often at relatively high temperatures and at relatively low pressures. In addition, the output gas is typically contaminated with condensed metal and salt dusts, and other undesirable substances which must be removed. Therefore, the inert gas must be cleaned and conditioned before it may be returned to the furnace. This conditioning process includes compressing the gas to a proper input level.

Although systems for cleaning gases are old, many of the techniques which are used in general applications will not work in metallurgical applications due to the purity of the gas required for proper process conditions. The types and amount of contaminants in the gas must be reduced to very low levels in order to assure the quality of the product. For example, when air-contaminated gas is exposed to molten titanium, the titanium readily absorbs both the oxygen and the nitrogen in the air. The amount of air in the inert gas must generally be less than 100 ppm for acceptable process conditions.

In the past, inert gases in plasma furnaces have either been vented to the atmosphere or recycled using oil-less compressors. However, the life of these compressors is short, the maintenance costs are very high and the contamination level due to air infiltration through the seals is unacceptable.

Some prior systems for cleaning gas for metallurgical processers have relied on oil-filled compressors. Oil-filled screw compressors, although quite efficient, have not been widely utilized, due to the amount of oil which can be vaporized into the gas stream.

SUMMARY

The present invention is directed to a system and process for conditioning and recycling inert gases which are used in a plasma furnace. The method comprises the steps of receiving the gas that is discharged from the plasma furnace and cooling the gas to a desired temperature. Substantially all the dust is removed from the gas and then the gas is compressed to the desired pressure using an oil-flooded screw compressor. Any oil which is introduced by the compressor is removed from the gas and an alarm is provided to signal a high oil level. Substantially all water vapor in the gas is removed and the gas is filtered to remove any remaining dust and small particulates. The amounts of water vapor and oxygen in the gas are monitored. The gas, substantially free from contaminants, is then recycled to the plasma furnace.

BRIEF DESCRIPTION OF THE DRAWING

FIG. 1 is a block diagram of a gas recycling process in accordance with the present invention.

DETAILED DESCRIPTION OF THE PREFERRED EMBODIMENT

In FIG. 1, a plasma furnace is indicated at 10 from which gas is discharged, usually at a high temperature, between 700° F. and 1500° F., and at relatively low pressures, approximately 3 psig.

Upon exiting the furnace 10, the output gas is piped by suitable means to a heat exchanger 12 in which the gas is cooled to a workable temperature of approximately 200 degrees Farenheit. In a preferred embodiment, heat exchanger 12 is a conventional water-cooled fin tube cooler wherein cooling water flows through a finned tube mounted coaxially within a pipe through which the hot process gas flows. Other types of heat exchangers of suitable capacity could be utilized if desired.

After the output gas has been cooled, it is transported to a cyclone 14 so that dust and metal scraps may be removed. The cyclone 14 is sized so that the scrap and dust particles, which average between 50 microns and 1 cm in size can be removed from the bottom of the cyclone. As in a typical cyclone, the dust-laden output gas enters the cyclone chamber tangentially, the cleansed gases leaving through a central opening at the top of the cyclone 14. The scrap and dust particles, by virtue of their inertia, will tend to move toward the outside separator wall from which they migrate to the bottom of the cyclone. In the preferred embodiment, a Model #XQ120-2 Cyclone, manufactured by Fisher-Klosterman, Inc. of Louisville, Kentucky, is used, although other models could be used.

The gas emerging from the top of the cyclone 14 is next introduced into a baghouse 16 which removes additional dust from the gas. In the baghouse 16, the output gas is passed through one of a plurality of woven fabric bags 18. The dust is trapped on the outer surface of the bags and the gas is allowed to pass through. In the preferred embodiment, the baghouse 18 is a Model #9-6

Cylindrical Bottom Removal Dust Collector manufactured by Fabric Filters Northwest of Portland, Oregon.

The bags 18 are made of a polyester-Gortex ® material, which has been found to satisfactorily filter out most of the dust in the process gas stream. The bags are cleaned intermittently throughout the run by means of gas pulses which are in a reverse direction to the regular flow of process gas. The dust from the bags settles to the bottom of the baghouse and is removed after the run.

The purpose of the cyclone 14 and the baghouse 16 is to remove the dust load from the gas and to provide relatively cool, clean gas to the compressor 28. Other suitable dust collection systems could be utilized if desired.

After leaving the baghouse 16, the outlet air is piped to inlet receiver 20. The purpose of the inlet receiver is to maintain reasonable system pressure during periods of fluctuating flow rates of the imcoming gas. For safety purposes, the inlet receiver 20 is supplied with a suitable relief valve 22.

The inlet receiver 20 is supplied with a basket filter 24 at its outlet 26 for further removing small dust particles from the gas. Typically, the filter 24 has a pore size of approximately three microns in order to trap dust particles with small diameters. A three micron filter, such as a Q1487 filter manufactured by Quincy Northwest of Portland, Oregon, may be utilized.

The gas is next piped to compressor 28 which compresses the gas to a desired pressure for reintroduction into the furnace 10. Typically, the gas is compressed to a pressure of approximately 100 psig.

An important feature of the present system is that compressor 28 is an oil-filled screw compressor. In general, oil-filled compressors have not been used for metallurgical applications since during the compression process, some of the oil which is used to seal the internal clearances and lubricate the rotors of the compressor may be vaporized into the gas. In order to remove this contamination, an oil separator 30 is connected to the compressor 28 to remove oil from the compressed gas. The oil which is collected by the separator 30 is recycled to compressor 28 via pipeline 32. In a preferred embodiment, compressor 28 is a Model QNW H235-A manufactured by Quincy Northwest of Portland, OR. The advantages of using a rotary screw compressor are its low cost, low maintenance requirement, high output pressure capabilities and its dependability.

We have also found that the use of vacuum pump oil in the screw compressor reduces the amount of oil which is picked up by the gas. Typically, screw compressors utilize automatic transmission fluid for lubrication and for sealing the screws of the compressor. However, we have found by using vacuum pump oil in the compressor, the oil picked up by the gas is markedly reduced due to the lower volatility of the vacuum pump oil. By using the vacuum pump oil in combination with the oil separator 30, the gas discharging from the oil separator is substantially oil-free.

To protect the furnace in the event of failure of the oil separator 30, a series of coalescing filters 34, 36 and 38 are positioned downstream from the oil separator to remove any oil from the gas leaving the separator 30. The coalescing filters each includes a chamber to collect the oil removed by the filter. A float-type oil-level detector and alarm 40 is provided in the chamber of coalescing filter 34. When the oil level in the chamber of filter 34 is about a predetermined level, alarm 40 signals an oil separator failure. In this manner, the oil-free quality of the gas being recycled to the furnace 10 will be assured.

A discharge receiver 42 of substantial volume is provided after the coalescing filter 38 to receive the output from the filter and serve as a surge tank. Discharge receiver 42 is provided with a suitable relief valve 44 for safety purposes.

The gas is next passed through a desiccant column 46, which removes any water vapor from the gas. Water vapor may possibly enter the gas by virtue of its presence in the metal feedstock or as a result of a leak in a cooling circuit. In general, any conventional desiccant, such as alumina or silica gel, can be used in the column 46.

Upon exiting the desiccant column 46, the gas is filtered by a particulate filter 48 which removes any dust or particles which the gas picked up in the desiccant colume 46. A filter with a pore size of approximately 3 microns will remove the desiccant particulates from the gas.

After passing through the particulate filter 48, moisture and oxygen monitors 50 sample the gas for both water vapor and oxygen content. These figures are recorded for later study. If desired, suitable alarms could be connected to the monitors 50 to detect system failures. The cleansed, pressurized inert gas is then recycled to the plasma furnace 10.

To place the system in operation, air is evacuated from the furnace 10 and the recycle system and the furnace oil system back-filled with the desired inert gas. The compressor 28 is started and gas is circulated through all the parts of the system. Any air that was trapped in any part of the system not pumpable is thus spread through the system. After a time, the compressor 28 is shut down and the system pumped down and back-filled again. The above is repeated until the level of air contamination is reduced to within specification. The furnace 10 may now be operated normally.

At the conclusion of a furnace run, the compressor 28 is turned off and the recycle system is valved off using shut-off valves 52 and 54. As long as the recycle system is not opened to atmosphere it is not necessary to pump it down again. Rather, the furnace 10 itself is pumped down and back-filled with the desired charge of inert gas. Valves 52 and 54 to the recycle system are opened and the compressor 28 started, readying the system for normal operation.

Although a preferred embodiment of the present invention has been shown, it is obvious that many modifications and variations of the invention are possible in light of the above teachings. It is therefore to be understood that the present invention may be practiced otherwise than as specifically described.

What is claimed is:

1. A system for recycling output gas from a plasma furnace, wherein the gas is typically at relatively high temperatures and relatively low pressures, and wherein the gas is typically contaminated with condensed metal and salt dust, the system comprising:
   cooling means for lowering the temperature of the gas to a desired temperature;
   means for receiving gas from the cooling means and removing dust from the gas;
   compression means for receiving gas from the dust removing means and for compressing the gas to a desired pressure, wherein the compression means comprises an oil-filled screw compressor and wherein the oil in the compressor comprises vacuum pump oil;
means for receiving the compressed gas and for removing oil from the gas; and
means for removing water vapor from the compressed gas.

2. The system of claim 1 wherein the cooling means is a heat exchanger.

3. The system of claim 1 wherein the means for removing dust comprises a cyclone.

4. The system of claim 1 wherein the means for removing dust comprises a bag house.

5. The system of claim 1 wherein the means for removing oil comprises an oil separator.

6. The system of claim 5, and further comprising:
alarm means for producing a signal indicative of a failure of the oil separator.

7. The system of claim 1 wherein the means for removing oil comprises a coalescing filter.

8. The system of claim 1 wherein the means for removing water vapor is a desiccant.

9. The system of claim 1 and further comprising:
monitoring means for sensing the amount of water vapor in the gas downstream from the water vapor removing means.

10. The system of claim 1 and further comprising:
monitoring means for sensing the amount of oxygen in the gas.

11. The system of claim 1 wherein the output gas comprises helium.

12. The system of claim 1 wherein the output gas comprises argon.

13. A method of recycling output gas from a plasma furnace, wherein the gas is typically at relatively high temperatures and relatively low pressures, and wherein the gas is typically contaminated with condensed metal and salt dust, the method comprising the steps of:
receiving the gas as it is discharged from the plasma furnace;
removing substantially all of the dust from the gas;
compressing the gas to a desired pressure using an oil-filled screw compressor wherein the oil comprises vacuum pump oil;
removing substantially all oil from the gas;
removing substantially all water vapor from the gas; and recycling the gas to the furnace.

14. The method of claim 13 wherein the gas is compressed to approximately 100 psig.

15. The method of claim 13 wherein the water vapor is removed using a desiccant.

16. The method of claim 13 and further comprising the step of:
cooling the gas to a desired temperature after it is received from the furnace.

17. The method of claim 16 wherein the gas is cooled to approximately 200 degrees Farenheit.

18. The method of claim 13 wherein the oil is removed from the gas using an oil separator.

19. The method of claim 18 and further comprising the step of:
providing an alarm for indicating a failure of the oil separator.

20. The method of claim 13 and further comprising the step of:
filtering the gas after it is compressed to remove any remaining particulates.

21. The method of claim 13 and further comprising the step of:
monitoring the amounts of water vapor and oxygen in the gas recycled back to the furnace.

22. A method of recycling output gas from a plasma furnace, wherein the output gas is typically at relatively high temperatures and relatively low pressures, and wherein the output gas is typically contaminated with condensed metal and salt dust, the method comprising the steps of:
receiving the gas discharging from the plasma furnace;
cooling the gas to a desired temperature;
removing substantially all of the dust from the gas;
compressing the gas to a desired pressuring using an oil-filled screw compressor wherein the oil comprises vacuum pump oil;
removing substantially all oil from the gas using an oil separator;
providing an alarm for indicating a failure of the oil separator;
removing substantially all water vapor from the gas;
filtering the gas to remove remaining dust and particulates;
monitoring the amounts of water vapor and oxygen in the gas; and
recycling the gas to the furnace.

23. A system for conditioning and recycling output gas from a plasma furnace, wherein the gas is typically at relatively high temperature and relatively low pressures, and wherein the gas is typically contaminated with condensed metal and salt dust, the system comprising:
a heat exchanger operatively connected to the furnace;
a cyclone operatively connected to the heat exchanger;
a bag house operatively connected to the cyclone;
an inlet receiver operatively connected to the bag house;
a first filter connected to an outlet of the inlet receiver;
an oil-filled screw compressor operatively connected to the first filter, wherein the compressor contains vacuum pump oil;
an oil separator operatively connected to the compressor;
a plurality of coalescing filters operatively connected in series to the oil separator;
a high oil level indicator and alarm operatively connected to one of the coalescing filters;
a discharge receiver operatively connected to the coalescing filters;
a desiccant column operatively connected to the discharge receiver;
a second filter operatively connected to the desiccant column; and
a moisture and oxygen monitor operatively connected to the second filter, wherein the output gas flows through the system and is returned to the plasma furnace.

* * * * *

UNITED STATES PATENT AND TRADEMARK OFFICE
CERTIFICATE OF CORRECTION

PATENT NO. : 4,845,334

DATED : July 4, 1989

INVENTOR(S) : Stephen C. Stocks and Patrick L. Rasmussen

It is certified that error appears in the above-identified patent and that said Letters Patent is hereby corrected as shown below:

In the Claims:

Column 6, line 17, "pressuring" should be --pressure--.

Signed and Sealed this

Tenth Day of July, 1990

Attest:

HARRY F. MANBECK, JR.

*Attesting Officer*     Commissioner of Patents and Trademarks